(12) United States Patent
Ishikawa

(10) Patent No.: US 6,686,603 B2
(45) Date of Patent: Feb. 3, 2004

(54) RAINDROP DETECTION APPARATUS AND METHOD

(75) Inventor: Junichi Ishikawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/093,507

(22) Filed: Mar. 11, 2002

(65) Prior Publication Data

US 2002/0126015 A1 Sep. 12, 2002

(30) Foreign Application Priority Data

Mar. 12, 2001 (JP) .......................... 2001-069207

(51) Int. Cl.[7] .............................................. G01N 15/06
(52) U.S. Cl. .................. 250/573; 250/214 A; 250/205; 318/444
(58) Field of Search ................................ 250/573, 574, 250/214 A, 214 AG, 214 C, 341.18, 349, 205; 15/250.001, 250.01, 250.12, DIG. 15; 318/444, 443

(56) References Cited

U.S. PATENT DOCUMENTS

| 4,595,866 A | 6/1986 | Fukatsu et al. |
| 4,859,867 A | * 8/1989 | Larson et al. ................. 318/444 |
| 4,867,561 A | 9/1989 | Fuji et al. |
| 4,956,591 A | * 9/1990 | Schierbeek et al. .......... 318/483 |
| 5,059,877 A | * 10/1991 | Teder ........................... 318/444 |
| 5,990,647 A | * 11/1999 | Zettler .......................... 318/483 |
| 2001/0050766 A1 | 12/2001 | Wakabayashi et al. |

FOREIGN PATENT DOCUMENTS

| JP | 61-122799 | 6/1986 |
| JP | 61-119467 | 7/1986 |

* cited by examiner

Primary Examiner—Kevin Pyo
Assistant Examiner—Seung C. Sohn
(74) Attorney, Agent, or Firm—Nixon & Vanderhye P.C.

(57) ABSTRACT

A raindrop detection apparatus has an amplifier circuit, including a plurality of resistors and resistor selection switches. The control circuit performs the first adjustment to an output of the amplifier circuit, roughly adjusting the output to a target value. The first adjustment is made by selecting one of or a combination of resistors. The control circuit then performs the second adjustment to the output, closely adjusting the output to the target value. The second adjustment is made by adjusting a driving instruction signal, which actually adjusts a light emitting device driving current. These adjustments are performed after an IG switch and an AUTO mode switch of a wiper switch are turned on.

13 Claims, 3 Drawing Sheets

RAINDROP DETECTION APPARATUS AND METHOD

CROSS REFERENCE TO RELATED APPLICATION

This application is based on and incorporates herein by reference Japanese Patent Application No. 2001-69207 filed on Mar. 12, 2001.

BACKGROUND OF THE INVENTION

The present invention relates to raindrop detection apparatus and method providing reliable raindrop detection regardless of conditions in which the raindrop detection apparatus is installed.

One application of a raindrop detection apparatus is for an automatic windshield wiper control device for a vehicle. This type of apparatus is generally installed on the interior surface of a front windshield of a vehicle. The apparatus includes a light emitting device and an optical raindrop detection device. Furthermore, the apparatus has an amplifying section, a light emitting device driving section, and a raindrop detection section.

The light emitting device emits light toward the front windshield. The optical raindrop detection device includes a photoreceptor which receives reflected light from the front windshield. An infinitesimal signal from the photoreceptor is amplified in the amplifying section. Under the condition in which no raindrop is present on the front windshield, an output from the amplifying section is fine adjusted to a predetermined target value (a reference value). The fine adjustment is made by changing a level of the signal from the photoreceptor. To change the level of the signal from the photoreceptor, light emission of the light emitting device is controlled by adjusting a power supplied to the light emitting device.

The fine adjustment to the output is made in a light emitting device driving section when the raindrop detection apparatus installed in a vehicle is turned on. Changes in the output from the amplifying section due to variation of components are accommodated so that the output is closely adjusted to the predetermined target value. The variation results from the light intensity characteristics of a photoreceptor and a light emitting device, the electrical characteristics of electrical circuits, the temperature characteristics of each component, and the installation instability of optics components.

The raindrop detection section determines the amount changed in the output from the reference value as a result of a raindrop on the front windshield.

As the raindrop detection apparatus is installed in various models of vehicles, it is required to be usable on various windshields having different thickness and curvature. Thickness and curvature, in other words, a refractive index and light transmittance of the windshields vary with models of vehicles. These variations make significant differences in the output because the reflected light from the windshield varies with models. Therefore, a large range adjustment capability is required for this type of raindrop detection apparatus in order to adjust the output to the predetermined target value.

If the apparatus has the large range adjustment capability, the output can be adjusted relatively close to the target value in the different conditions. However, configuration of the apparatus becomes complex, and the adjustment range is limited since it is defined by a light emitting capacity of the light emitting device.

Moreover, when improving a conversion accuracy of a digital-to-analog (D/A) converter, a signal-to-noise (S/N) ratio is traded off. To maintain reasonable S/N ratio, the conversion accuracy of the D/A converter cannot be improved as desired. As a result, the output cannot be adjusted within a desirable range.

SUMMARY OF THE INVENTION

The present invention therefore has an objective to provide a raindrop detection apparatus enabling wide range adjustment to an output from an amplifier section with relatively simple configurations.

The present invention has another objective to provide a method for a reliable raindrop detection regardless of conditions of the raindrop detection.

A raindrop detection apparatus of the present invention includes a light emitting device, and a photoreceptor. Furthermore, the apparatus has a light emitting device driving section, an amplifying section, and a control section. The light emitting device emits light toward an object on which a raindrop falls. The photoreceptor receives reflected light from the object. The driving section controls a power supply to a light emitting device. The amplifying section amplifies a signal from a photoreceptor. The control section controls operations of the driving section and the amplifying section, and detects a raindrop on the object.

The control section also has a first and a second adjustment members. The first adjustment member adjusts an output from the amplifying section to a predetermined target value by varying amplifying gains. The second adjustment member adjusts the output to the target value by varying a power supply to the light emitting device after the first adjustment is completed. The first adjustment is for roughly adjusting the output to the target value in steps, and the second adjustment is for adjusting the roughly adjusted output more closely to the target value.

As those members utilize different components and take care of different adjustment ranges, capability and adjustment range requirements for each adjustment are reduced. This permits the raindrop detection apparatus to have a relatively simple configuration while providing a wide range adjustment for the output from the amplifying section.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

A preferred embodiment of the present invention will be explained referring to the accompanying drawings.

Figure 1:
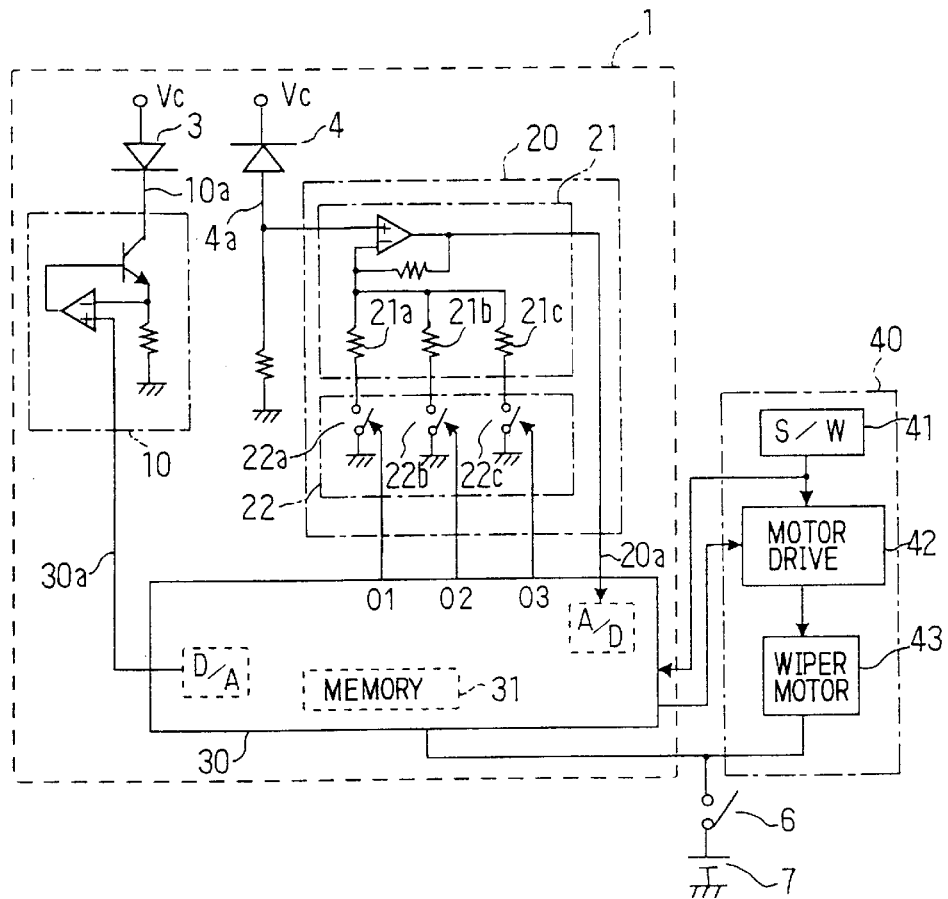
FIG. 1 is a block diagram showing a windshield wiping system including a raindrop detection apparatus according to the present invention.
Figure 2:
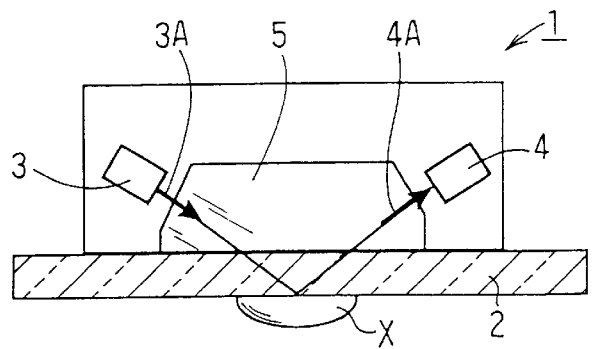
FIG. 2 is a schematic diagram showing any optics section of the raindrop detection apparatus installed on a front windshield.

Referring to FIGS. 1 and 2, a raindrop detection apparatus 1, installed in a vehicle, has an optics section and an electrical circuit section. The optics section includes a light emitting diode (LED) 3, a photo diode (PD) 4, and a prism 5, which are attached to the interior surface of the windshield 2. The LED 3 emits light 3A in response to an LED driving signal 10a to be reflected by the windshield 2. The PD 4 receives reflected light 4A. The reflected light 4A is darkened corresponding to the amount of a raindrop X on the windshield 2 before it reaches the PD 4. Then, the PD 4 outputs a signal 4a in response to the amount of the reflected light 4A. The prism 5 guides the incident light 3A and the reflected light 4A in traveling to right places.

A windshield wiper driving unit 40 is connected to the raindrop detection apparatus 1. The wiper driving unit 40 includes a wiper switch 41, a wiper motor driving circuit 42, and a wiper motor 43. The wiper driving unit 40 is configured so that the raindrop detection apparatus 1 controls the wiper motor driving circuit 42 based on the wiping mode selected by the wiper switch 41.

The electrical circuit section of the raindrop detection apparatus 1 includes an LED driving circuit 10, an amplifier circuit 20, and a control circuit 30. The LED driving circuit 10 controls a power supply to the LED 3. The amplifier circuit 20 amplifies the signal 4a from the PD 4. The control circuit 30 includes a microcomputer (CPU) which determines the amount of the raindrop X on the front windshield 2 based on the output 20a of the amplifier circuit 20.

The LED driving circuit 10 drives the LED 3. A constant current is fed to the LED 3 in response to a driving instruction signal 30a outputted from the control circuit 30. Vc indicates a constant voltage source where a voltage output of the battery 7 is maintained constant.

The amplifier circuit 20 includes a voltage amplifier circuit 21 and resistor selection switches 22a, 22b and 22c. The voltage amplifier circuit 21 is to receive and to amplify the signal 4a, which is an infinitesimal voltage signal, from the PD 4. The resistor selection switches 22a, 22b and 22c are for selecting one of or a combination of resistors 21a, 21b and 21c. By selecting the resistors 21a, 21b and 21c, an output 20a can be closely amplified to a predetermined value.

An amplifying gain can be modified stepwise by selecting one of or a combination of resistors 21a, 21b, and 21c. By selecting the resistors 21a, 21b, and 21c, resistance for the amplifier circuit 20 can be modified. As a result, the output 20a can be closely adjusted to the predetermined target value. Although only three resistors 21a, 21b, and 21c are used in this embodiment, more resistors enable more precise adjustment to the output 20a.

The predetermined target value is stored in a memory 31 within the control circuit 30. The control circuit 30 sends signals to the resistor selection switches so that a stepwise adjustment is made to the output 20a. In this adjustment, a voltage width to vary is determined by the smallest unit of resistance available in the amplifier circuit.

The control circuit 30 performs a fine adjustment to a power supply for driving the LED driving circuit 10, namely, to a constant current for driving the LED 3. The control circuit 30 compares the output 20a with the predetermined target value, and adjusts a driving current 10a for the LED 3 so that the output 20a matches the target value. In this process, the driving current 10a is varied within a relatively small range. The control circuit 30 changes amounts of the incident light 3A and the signal from the PD 4 to change the output 20a. The control circuit 30 stores the value of an LED driving current measured at the time when the output 20a matches the predetermined target value into the memory 31. This value is used as the LED driving current value.

The rough adjustment by the amplifier circuit 20 and the fine adjustment by the LED driving circuit 10 are performed in the condition in which no raindrop X is present on the front windshield 2. For example, they are performed after the front windshield 2 is wiped out with wipers (not shown). More specifically, the control circuit 30 starts the rough and fine adjustments after it sends an instruction to the wiper motor circuit 41 to perform a windshield wiping operation. Then, a condition in which no raindrop X is present on the windshield 2 is set.

A regular raindrop detection starts after the adjustments to the output 20a are completed. The control circuit 30 starts the raindrop detection operation utilizing resistor selection data and LED driving current value stored in the memory 31.

Figure 3:
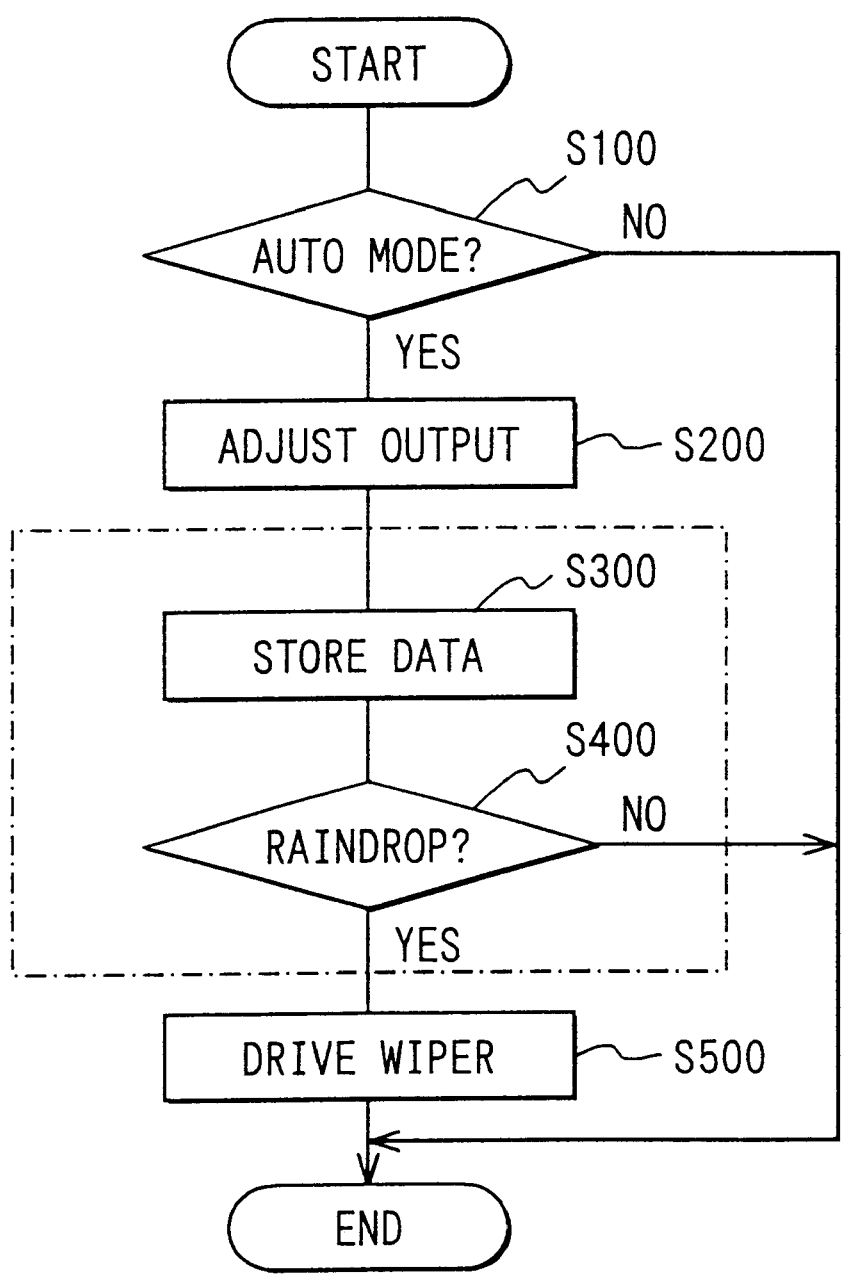
FIG. 3 is a flowchart showing a control operation of the windshield wiping system.

Control operation in the wiper system is discussed in detail referring to FIGS. 1 and 3. When the ignition (IG) switch 6 is turned on, a power is supplied to the devices 1 and 40 by the battery 7. Then, if it is determined at step S100 that the AUTO mode switch of the wiper switch 41 is turned on, an output adjustment process starts at step S200. The condition to activate the output adjustment process is that the IG switch 6 and the AUTO mode switch of the wiper switch 41 are both turned on. When the IG switch 6 is turned on under the condition that the AUTO mode switch is turned on, the control operation proceeds to the output adjustment step S200. The output adjustment process will be discussed later referring to FIG. 4. If the AUTO mode switch is not turned on, the operation is terminated.

When the output adjustment process is completed and the output 20a matches the target value, raindrop-related data is stored at step S300. The raindrop-related data is such data as related to the output 20a, especially amount of difference in the amplifier circuit 20, which is varied due to a raindrop X on the front windshield 2.

At step S400, the control circuit 30 obtains the amount varied in the output 20a as a result of comparing the output data which matches the target value with the output data obtained at step S300. Also, the control circuit 30 judges the amount of the raindrop X on the windshield 2 based on the amount varied at this step. If the raindrop X is detected, the process is proceeded to step S500 to automatically drive the wiper motor 43. If no raindrop X is detected, the process ends. S300 and S400 refer to as the raindrop detection process.

At step S500, the control circuit 30 directs the wiper motor driving circuit 42 to drive the wiper motor 43. The control circuit 30 sends the instruction to the driving circuit 42 based on the size of the signal obtained at step S400. The driving circuit 42 drives the wiper motor 43 following this instruction.

Figure 4:
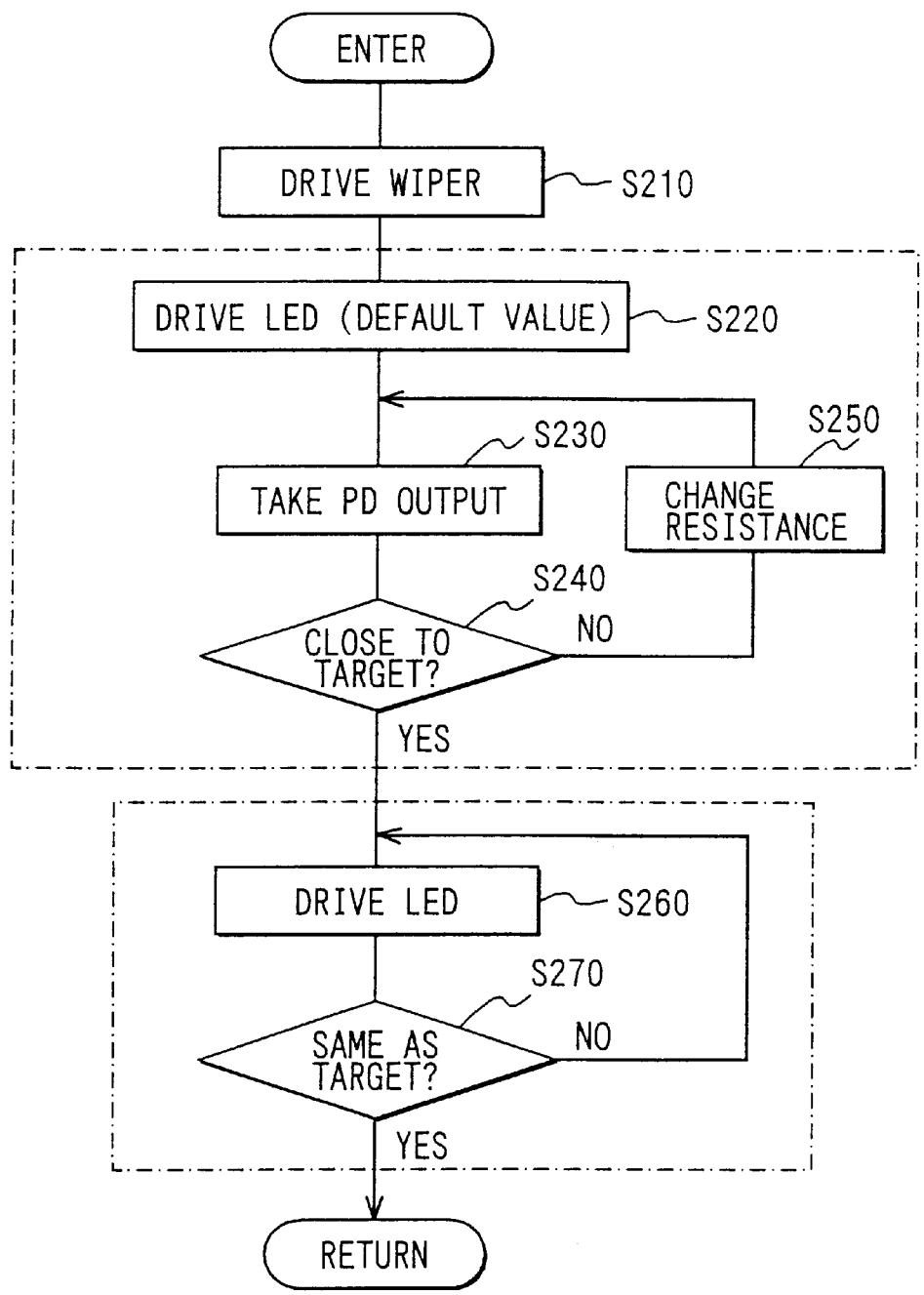
FIG. 4 is a flowchart showing a fine adjustment process of the raindrop detection apparatus.

Referring to FIGS. 1 and 4, the output adjustment process at step S200 is discussed. At step S210, the wiper motor 43 is rotated for predetermined times so that raindrop X on the windshield 2 is wiped out. The instruction to drive the wiper motor 43 is sent by the control circuit 30 and passed to the driving circuit 42.

At step S220, a driving instruction signal 30a which is converted from digital to analog within the control circuit 30 is sent to the LED driving circuit 10. Then, the process is proceeded to step S230. The driving instruction signal 30a is stored in the memory 31 of the control circuit 30 as a default value. The LED driving circuit 10 receives the driving instruction signal 30a and sends the driving signal 10a to the LED 3 to emit light.

At step S230, the control circuit 30 takes data in response to a signal 4a from the PD 4. More specifically, the PD 4 sends the signal 4a to the amplifier circuit 20 in response to the amount of light which the PD 4 receives. The amplifier circuit 20 amplifies the signal 4a, and produces the output 20a. The control circuit 30 converts the output 20a from analog to digital, and stores it in the memory 31. The amplifying rate, namely, one of or a combination of resistors 21a, 21b and 21c, are stored in the memory 31 as default setting data.

At step S240, it is determined whether the output 20a is most closely adjusted to the target value stored in the memory 31. To make this determination, the steps S230, S240 and S250 for selecting one of or a combination of resistors 21a, 21b and 21c are repeated. The output 20a varies from repeat to repeat, and the closest value of the output 20a to the target value is selected. The control circuit 30 controls the switches 22a, 22b and 22c to reproduce the same resistor setting as the one when the output 20a becomes the closest to the target value. The rough adjustment to the output 20a to the target value is completed when the appropriate resistor (21a, 21b, 21c) or a combination of the resistors (21a, 21b, 21c) is selected.

After the rough adjustment to the output 20a is completed, the process is proceeded to step S260. At step S260, the control circuit 30 makes an adjustment to the driving instruction signal 30a. The driving instruction signal 30a is sent to the LED driving circuit 10 so that the output value 20a matches the target value. This is actually adjusting the brightness of the LED 3.

At step S270, it is determined whether the output 20a matches the target value after the driving instruction signal 30a is adjusted by the control circuit 30. More specifically, the control circuit 30 determines the output 20a if it matches the target value by changing the amount of light emission from the LED 3, which changes the signal 4a of the PD 4. If the control circuit 30 determines that the output 20a does not match the target value, the process is returned to step S260. When the fine-adjusted output 20a matches the target value, this output adjustment process is completed.

This process is executed in the condition in which no raindrop X is present on the front windshield 2. The adjusted output 20a is determined as a reference value for a raindrop detection determination. The amount varied from the reference value due to the raindrop X on the windshield 2 is detected by the control circuit 30. The control circuit 30 sends the windshield wiping instruction to the wiper motor driving circuit 42 in response to the amount varied.

The output 20a is roughly adjusted by the amplifier circuit 20, and fine adjusted by adjusting the driving instruction signal 30a sent to the LED driving circuit 10. Therefore, the wide range adjustment to the output 20a is available even if changes in the output 20a become significant due to changes in installation environment or characteristics of the raindrop detection apparatus 1.

Furthermore, the output 20a is adjusted to the target value every time the vehicle is in operation. Therefore, output characteristics of the amplifier circuit 20 remains within predetermined settings even when an installation environment varies with models of vehicles or characteristics of the apparatus changes. As a result, accuracy of the raindrop detection remains stable.

As described above, the rough (first) and the fine (second) adjustments are performed by different components and the adjustment range is split. Therefore, capabilities and adjustment ranges required for each adjustment are reduced. This permits a wide range adjustment to the output 20a of the amplifier circuit 20 with relatively simple configuration.

Moreover, The raindrop detection apparatus 1 also contributes to reduced production cost because the rough adjustment to the output 20a can be made automatically while it has been made manually for each type of vehicle.

The present invention should not be limited to the embodiment previously discussed and shown in the figures, but may be implemented in various ways without departing from the spirit of the invention.

For example, the raindrop detection apparatus 1 can be utilized for windshields of boats, vessels, ships, and airplanes, or windows of houses and buildings. Further, the adjustments to the output 20a can be made without creating a no raindrop condition. Instead, the output 20a at the last time when the IG switch 6 and the AUTO mode switch of the wiper switch 41 are turned on can be used as a reference value. The output adjustments are performed utilizing this reference value as long as the IG switch 6 and the AUTO mode switch are turned on.

What is claimed is:

1. A raindrop detection apparatus comprising:
    a light emitting device which emits light toward a windshield where a raindrop may be present;
    a light emitting device driving section supplying a power to the light emitting device;
    a photoreceptor which receives reflected light from the windshield, emitted from the light emitting device;
    an amplifying section amplifying a signal from the photoreceptor; and
    a control section detecting an amount of the raindrop on the windshield based on an output from the amplifying section as well as controlling operations of the light emitting device driving section and the amplifying section;
    wherein the control section includes:
        a first adjustment means which adjusts the output from the amplifying section to a predetermined target value by varying amplifying gains of the amplifying section, and
        a second adjustment means which adjusts the output to the target value by varying a power supplied from the light emitting device driving section to the light emitting device after the adjustment by the first adjustment means; and
        wherein the output adjustments performed by the first and the second adjustment means are programmed to execute output adjustment operations under a condition in which no raindrop or foreign substance is present on the windshield, the condition in which no raindrop or foreign substance is present on the windshield being created by mandatorily wiping the windshield.

2. A raindrop detection apparatus as in claim 1, wherein the amplifying section includes an amplifying gain adjustment means which operates in conjunction with the first adjustment means to adjust the output by varying the amplifying gains of the amplifying section.

3. A raindrop detection apparatus as in claim 2, wherein the amplifying gain adjustment means further includes a resistor selection member for selecting one of or a combination of resistors to determine the amplifying gain.

4. A raindrop detection apparatus as in claim 1, wherein the control section is programmed to perform a raindrop detection process after a power is supplied to the light emitting device driving section and the amplifying section based on the amounts of power and amplifying gain determined by the first and the second adjustment means.

5. A raindrop detection method comprising:
   setting up a target value indicative of no raindrop or foreign substance on a windshield, the target value being set up after the windshield is mandatorily wiped so that no raindrop or foreign substance is on the windshield;
   changing amplifying gains of an amplifying section where a signal from the photoreceptor is amplified so that an output from the amplifying section becomes close to the target value; and
   changing a power supply to the light emitting device so that the output from the amplifying section becomes still closer to the predetermined target value.

6. A raindrop detection method as in claim 5, further comprising:
   comparing the output from the amplifying section with the target value;
   storing data relating to a selected one of or a combination of resistive components in memory if the output matches the target value;
   reselecting one of or a combination of resistive components if the output does not match the target value;
   storing data relating to one of or a combination of resistive components at the time when the output becomes closest to the predetermined target value.

7. A raindrop detection method as in claim 5, further comprising performing a raindrop detection process based on the amplifying gain and the power supply determined in changing the amplifying gains of the amplifying section and changing the power supply to the light emitting device after powers are supplied to a light emitting device driving section and the amplifying section.

8. A raindrop detection method as in claim 5, wherein changing the amplifying gain includes changing the amplifying gain in steps.

9. A raindrop detection method for a wiper system mounted on a vehicle having an ignition switch and a windshield, the wiper system including a raindrop sensor, a wiper and a wiper driving unit which is automatically operable in response to an output of the raindrop sensor that detects raindrops, the method comprising:
   mandatorily operating the wiper driving unit in response to each turn-on of the ignition switch thereby to wipe the windshield irrespective of the output of the raindrop sensor when the wiper driving unit is in a state of readiness to automatically operate the wiper;
   adjusting the output of the raindrop sensor to a predetermined target value following mandatorily operating the wiper driving unit; and
   automatically operating the wiper driving unit in response to the output of the raindrop sensor indicative of raindrops after the adjustment of the output of the raindrop sensor is completed.

10. A raindrop detection method as in claim 9, wherein the wiper system includes a wiper motor and a wiper switch for setting operation modes of the wiper driving unit including the automatic operation mode, and
   mandatorily operating the wiper further includes:
     determining whether the wiper switch is set to the automatic operation mode; and
     operating the wiper driving unit until the wiper motor is rotated to wipe the windshield a predetermined number of times when the automatic operation mode of the wiper switch is determined.

11. A raindrop detection method as in claim 9, wherein the raindrop sensor includes a light emitting device, a light emitting device driving circuit, a photoreceptor and an amplifier circuit, and
   adjusting the output of the raindrop sensor further includes:
     adjusting an output of the amplifier circuit that receives an input from the photoreceptor until the output becomes close to the predetermined target value by varying amplifying gains of the amplifier circuit; and
     adjusting the adjusted output still closer to the predetermined target value by varying power supplied from the light emitting device driving circuit to the light emitting device.

12. A raindrop detection apparatus comprising:
   a light emitting device which emits light toward an object where a raindrop may be present;
   a light emitting device driving section supplying a power to the light emitting device;
   a photoreceptor which receives reflected light from the object, emitted from the light emitting device;
   an amplifying section amplifying a signal from the photoreceptor; and
   a control section detecting an amount of the raindrop on the object based on an output from the amplifying section as well as controlling operations of the light emitting device driving section and the amplifying section,
   wherein the control section includes:
     a rough adjustment means which adjusts the output from the amplifying section to a first value which is at least close to a predetermined target value by varying amplifying gains of the amplifying section, and
     a fine adjustment means which adjusts the output to a second value which is closer than the first value to the target value by varying a power supplied from the light emitting device driving section to the light emitting device after the adjustment by the rough adjustment means.

13. A raindrop detection apparatus as in claim 12, wherein the first value is close to the target value and the second value matches the target value.

* * * * *